Figure 1:
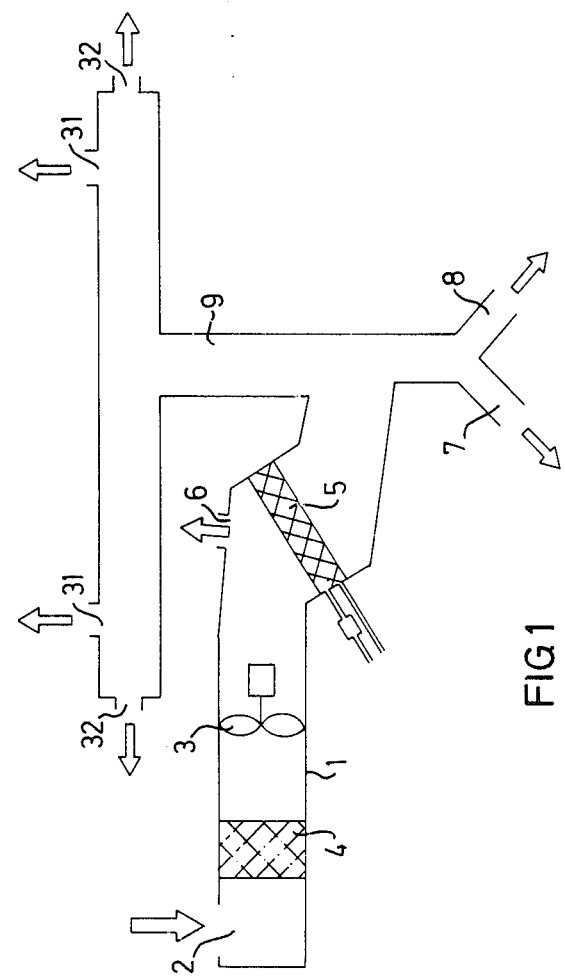

United States Patent [19]

Pärsson

[11] 4,319,519
[45] Mar. 16, 1982

[54] ARRANGEMENT IN A VENTILATION SYSTEM FOR A VEHICLE

[75] Inventor: Nils O. Pärsson, Trollhättan, Sweden

[73] Assignee: Saab-Scania Aktiebolag, Sodertalje, Sweden

[21] Appl. No.: 28,699

[22] Filed: Apr. 10, 1979

[30] Foreign Application Priority Data

Apr. 18, 1978 [SE] Sweden .................... 7804358

[51] Int. Cl.³ .............................. B60H 3/00
[52] U.S. Cl. ................................. 98/2.11
[58] Field of Search ............... 98/2.11; 62/298, 299, 62/239, 427

[56] References Cited

U.S. PATENT DOCUMENTS

| 2,213,017 | 8/1940 | Perkins | 98/2.11 |
| 2,780,077 | 2/1957 | Jacobs | 98/2.11 |
| 2,811,913 | 11/1957 | Anderson | 98/2.11 |
| 3,522,839 | 8/1970 | Wendt et al. | 98/2.11 |
| 3,651,659 | 3/1972 | Nakao et al. | 98/2.11 |
| 3,657,992 | 4/1972 | Minnick, Jr. | 98/2.11 |
| 4,007,875 | 2/1977 | Stolz et al. | 98/2.11 |

FOREIGN PATENT DOCUMENTS

| 296372 | 7/1971 | Austria. |
| 2212687 | 9/1973 | Fed. Rep. of Germany. |
| 2241647 | 4/1974 | Fed. Rep. of Germany. |

Primary Examiner—Lloyd L. King
Attorney, Agent, or Firm—Cushman, Darby & Cushman

[57] ABSTRACT

A ventilation system for a vehicle is provided with a ventilation housing through which air from an outer air intake is fed to at least one air outlet opening in the vehicle passenger compartment. In the ventilation housing there is a fan which, when energized acts on the airflow through the ventilation housing. The ventilation housing is provided with an opening which allows insertion, in the transverse direction of a passage in the housing, of a filter unit, which can comprise a filter insert in a cassette and/or an evaporator in a cooling system.

6 Claims, 4 Drawing Figures

ARRANGEMENT IN A VENTILATION SYSTEM FOR A VEHICLE

The present invention relates to an arrangement in a ventilation system for a vehicle, comprising a ventilation housing mounted in the vehicle, and formed with a through passage for leading air from an outer air intake to at least one air outlet opening out in the vehicle passenger compartment, a fan being arranged to act on the air flow through said passage on being energized. It is known to form the ventilation system in vehicles in combination with a heating system and/or a cooling system to regulate the temperature of the ventilation air before entering into the passenger compartment. For heating purposes, air supplied to the passenger compartment is arranged to pass through a heat exchanger incorporated in the heating system, the heat exchanger transferring excess heat obtained from the driving unit in a manner known per se to the passing ventilation air. For cooling purposes, ventilation air is arranged in the same way to pass an evaporator in a cooling system installed in the vehicle, a so-called air conditioning system, before the ventilation air is supplied to the passenger compartment. When passing the evaporator, the ventilation air has its temperature reduced, but a certain amount of filtration of this air is obtained at the same time.

Such a cooling system is generally formed as an optional extra unit since in less hot countries there is no justification for providing standard vehicles with cooling units. However, space for such a unit must be provided for in every vehicle, independent of whether the extra unit is to be utilized or not. This space must also be located in portions of the vehicle where space is generally most limited, i.e. in the forward portion of the vehicle passenger compartment contiguous to a forward engine compartment.

In vehicles which are only equipped with ventilation and heating systems, it is usual to pass ventilation air to the passenger compartment without any purification at all. This has not caused any serious problems previously, but ever-intensifying traffic and the air pollution it causes demand measures for protecting vehicle users.

Air pollutants are present in the form of gases and also in the form of solid and liquid particles. To a major extent, air pollutants are waste products from combustion processes as well as swirling dust and particles. The gases can appear freely in the air, and dissolved on/in solid particles, which in the form of airborn dust can be soot, asphalt, metal oxides, quartz particles etc.

The air pollutants are extremely uncomfortable for vehicle users, since vehicles ahead and those coming from the opposite direction generate curtains of exhaust gases and solid particles which swirl around, through which each individual vehicle must travel. This causes the air, supplied to a vehicle passenger compartment without purification, to get a degree of concentration of air pollutants which is considerably larger than that applicable to the area as such through which the vehicle is travelling. This means that a person in a vehicle who often has to travel under such conditions will be subjected to a considerable health risk when breathing the air supplied to the vehicle passenger compartment. Furthermore, driving safety is also affected since bad air causes tiredness in the driver, and because coatings of film on the windows of the vehicle impair the viewing conditions, especially when driving against the light.

For the purpose of separating air pollutants, it is known to provide exchangable filters in ventilation ducts to the passenger compartment of a vehicle for purifying the air passing through. Known embodiments of such air filtration have not won any extended application, however. Firstly, the purifying ability of the filters has been found insufficient, secondly, the filters have caused too great a pressure drop for the ventilation air, and thirdly, the properties of the filters have varied too greatly, depending on the air temperature and relative humidity. Said disadvantages and the fact that the available space in a vehicle for placing a ventilation housing with filtering effect is often very limited have resulted in that most vehicles in less hot countries are not equipped with air cleaners for the vehicle passenger compartment.

The present invention has the object of forming and arranging a ventilation system, which either separately or in combination with a heating system and/or a cooling system enables the purification of air supplied to a vehicle passenger compartment, preferably with a degree of filtration attaining to at least 90 (ninety) percent, by which is meant complete removal of particles greater than $5\mu$ and a seventy-five percent removal of particles less than $5\mu$.

According to the invention the ventilation housing is formed with at least one opening which, in the transverse direction of the passage, allows insertion and fastening of a filter unit to the ventilation housing, said filter unit comprising a filter insert in a cassette and/or an evaporator in a cooling system. Filtration of air supplied to the ventilation housing before coming into the passenger compartment is thus obtained.

The invention is further distinguished in that at least the part of the evaporator intended for insertion in the passage in the ventilation housing has the same form and dimensions as the cassette for the filter insert.

Other properties distinguishing the invention are apparent from the description of an embodiment exemplifying the invention set forth below.

Figure 2:
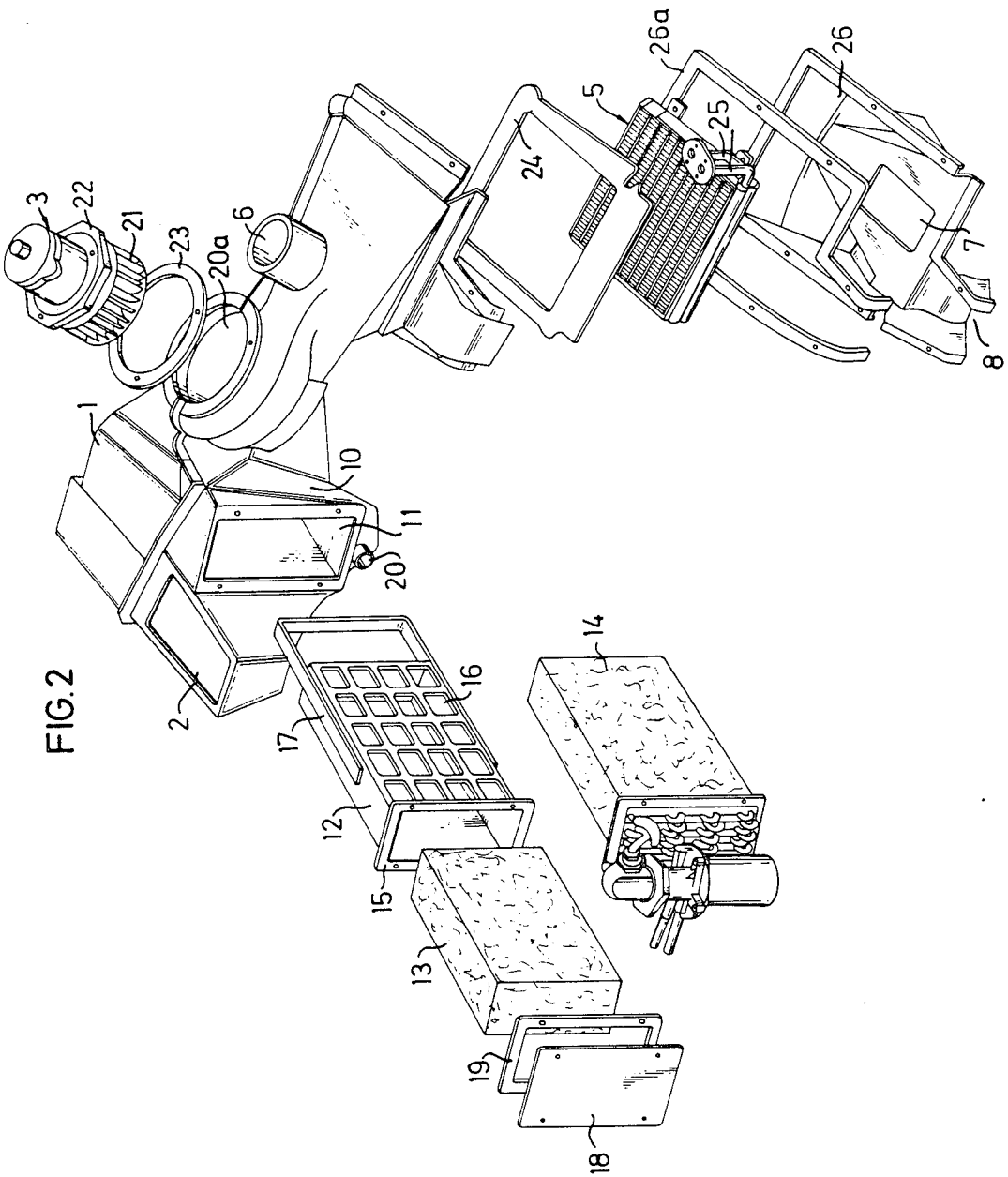
Figure 3:
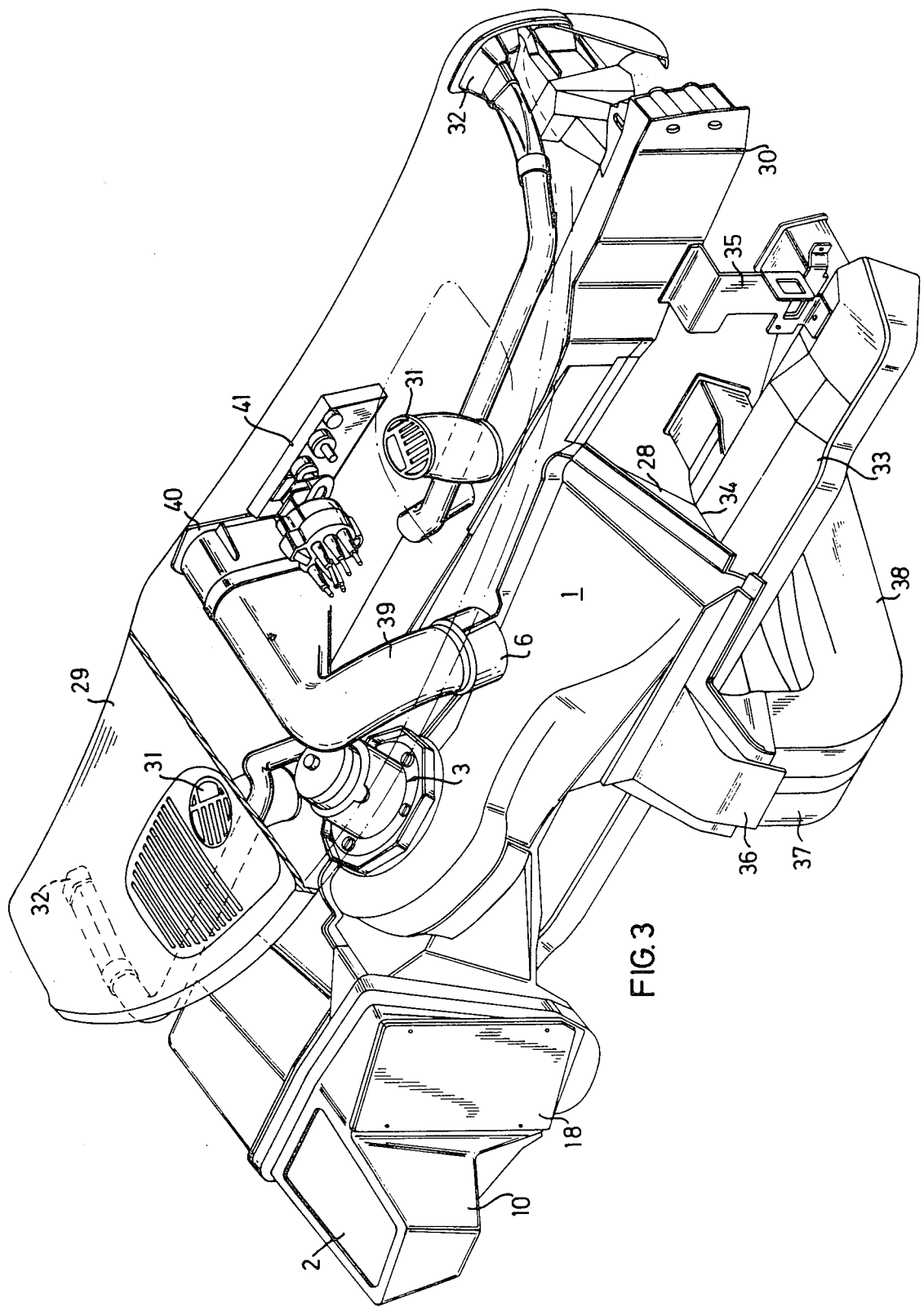
Figure 4:
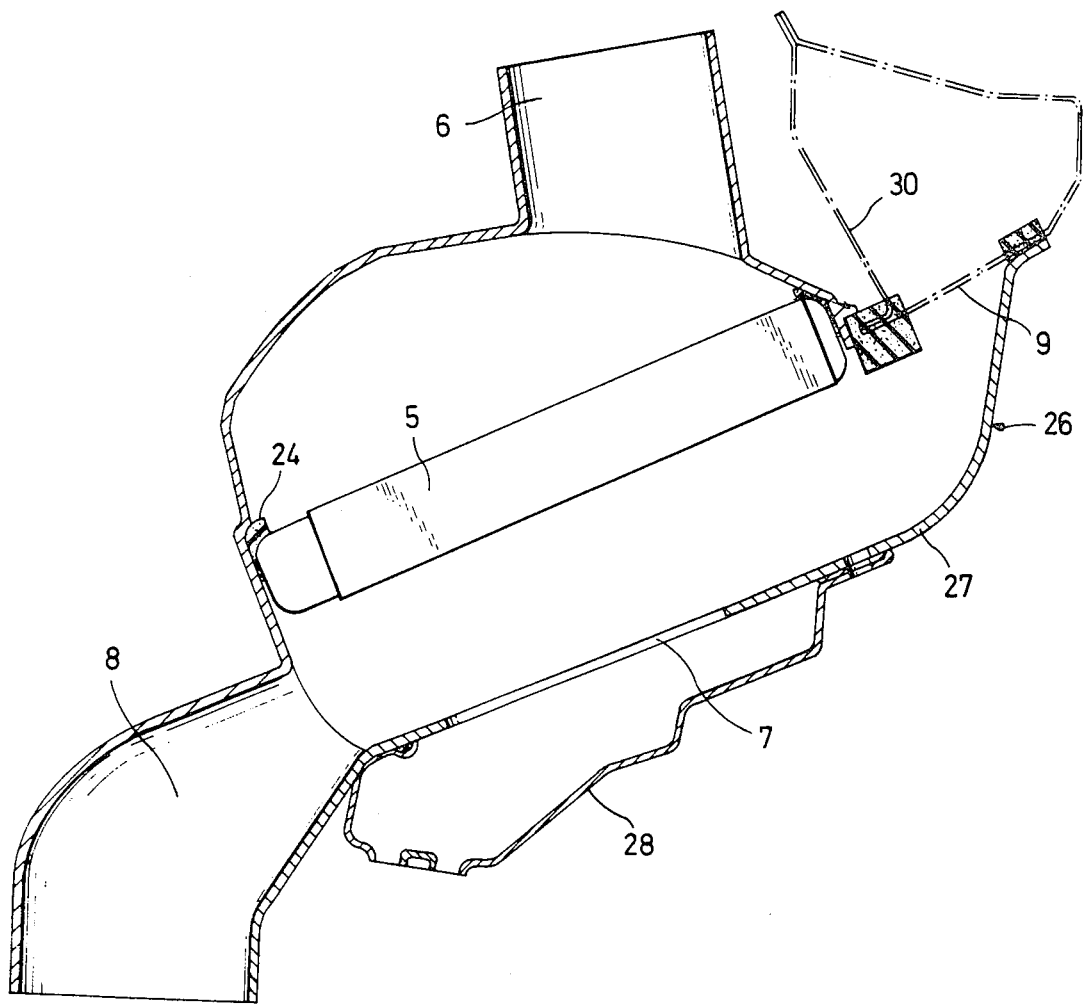

The invention will now be described while referring to the accompanying drawings on which FIG. 1 is a principle sketch of the inventive arrangement, FIG. 2 is an exploded perspective view of a ventilation housing with associated devices, FIG. 3 illustrates in a perspective view the inventive arrangement applied to a vehicle and FIG. 4 is a cross section of the ventilation housing in FIG. 2.

A ventilation system for a vehicle, illustrated in FIG. 1, comprises a ventilation housing 1, into which air from the outside of the vehicle is fed in via an inlet opening 2 at one end. The supply of air takes place under the effect of the free-stream, but can be intensified with the help of a fan 3 mounted in a longitudinal through passage in the ventilation housing 1. The air is caused to pass through a filter unit 4 placed transversely in the through passage, said filter unit either being a filter composition arranged in a cassette, or an evaporator in a cooling system associated with the ventilation housing 1. After the fan 3, the air is forced towards the other end of the ventilation housing 1, in said end there being arranged a plurality of air outlets 6, 7, 8 and 9 for supplying the air to the vehicle passenger compartment. In said end there is also mounted a heat exchanger 5 perpendicular to the through passage in the ventilation housing 1, this heat exchanger being part of a conventional heating system (not shown). The principle of such a heating system is based on coolant from the driving unit flowing through elements in the heat exchanger 5, excess heat from the driving unit thus being transferred to the heat exchanger 5 and to the air surrounding and-/or passing through it. Heat transfer to the heat exchanger 5 and its surroundings can be adjusted conventionally, as can the quantity of air passing through the heat exchanger 5, all according to requirements.

The ventilation housing 1 is formed with an outlet 6 between the fan 3 and the heat exchanger 5, said outlet being connected to so-called fresh air nozzles in the forward portion of the passenger compartment via ducts (not shown). Downstream of the heat exchanger 5 the ventilation housing 1 is formed with a plurality of outlets 7–9, which, via branch ducts take heated air to different nozzles in the passenger compartment. One outlet 7 branches out to nozzles at the floor in the forward portion of the compartment, another outlet 8 branches out to nozzles in the rear portion of the compartment, and a third outlet 9 branches out to nozzles 31,32 in and at the vehicle instrument panel.

FIG. 2 shows an advantageous embodiment of the ventilation housing 1 and devices connected to it for the inventive coaction. The ventilation housing 1 is formed for transverse installation in the forward part of the vehicle passenger compartment in juxtaposition to a cowl panel (not shown) separating the passenger compartment from a forward engine compartment in the vehicle. A collecting box 10, constituting a part of the ventilation housing 1, is arranged for being sealingly thrust into the engine compartment, the inlet opening 2 of the ventilation housing 1 being formed in said box 10, which is also formed with a vertical rectangular aperture 11 for introducing the filter 4 transverse to the direction of the through passage in the ventilation housing 1. As previously mentioned, the filter 4 can either comprise a separate air filter 13 arranged in a cassette 12, or an evaporator 14 in a cooling system.

The cassette 12 is formed as a parallel epipede having two pairs of opposing walls and a unifying frame 15 at the outer end. The vertical walls are formed with a pattern of substantially rectangular perforations 16 for the passage of air. The air filter 13 is inserted through the frame 15 and between the walls, said filter comprising a filter composition which has been given a shape to suit the cassette 12. The air filter 13 is made of glass fibre material and is formed with a decreasing porosity in the flow direction, air polluting particles thus meeting a successively increasing resistance to permeability in the filter 13. To prevent sucking air past the sides of the air filter 13, a surrounding sealing strip 17 is placed between the walls of the through passage of the ventilation housing 1 and the cassette 12, and at the opening 11 there is a seal 19 between the cassette frame 15 and an outer cover plate 18 to prevent leakage. The cassette filter 12,13 is locked into position, after it is inserted in the ventilation housing 1, by a plurality of screws (not shown) fastened into the ventilation housing 1 through free holes in the cover plate 18, sealing strip 19 and cassette frame 15.

In the case where the vehicle is to be equipped with a cooling system, a so-called air conditioning system, the cassette filter 12,13 is replaced by an evaporator 14. In the portions coacting with the ventilation housing 1, this evaporator is formed with the same dimensions as the cassette filter 12,13 and is attached in the same way as the cassette 12. From the point of view of installation, said likenesses result in significant advantages, since the space required by an evaporator 14 in a vehicle can always be effectively utilized for purifying the air supply to a vehicle passenger compartment. When the space is utilized by an evaporator 14, it is necessary to be able to tap off condensed water from said space. For this purpose a drain pipe 20 is arranged under the opening 11 in the ventilation housing 1, this pipe opening out into the engine compartment from the bottom of the through passage in the ventilation housing 1. The connections of the evaporator 14 to the remaining devices in the cooling system are quite conventional and are therefore described no further.

It is also shown in FIG. 2 how the fan 3 is arranged for mounting in the ventilation housing 1. By means of a flanged opening 20a in the upper part of the ventilation housing 1, the fanwheel 21 is accommodated transversely to the through passage so that a rigid flange on the fan housing 22 is caused to abut via a sealing ring 23 against the fixed flange on the ventilation housing 1, the fan 3 then being attached to the ventilation housing 1 via a plurality of screws going through free holes in the fan housing 22. The fan 3 is suitably an axial suction fan, and electrical connections for driving the fan motor are quite conventional and are therefore not described further.

It is apparent from FIGS. 2 and 4 how the heat exchanger 5 incorporated in the heating system of the vehicle is arranged in the through passage of the ventilation housing 1. With a sealing strip 24 in between, the heat exchanger abuts against stops around a substantially square opening (not shown) in the lower part of the ventilation housing 1, and is fastened thereto by means of a plurality of screws (not shown). Inlet and outlet pipes 25 for elements included in the heat exchanger 5 are conventionally in communication with other devices (not shown) incorporated in the heating system.

Upstream of the heat exchanger 5, in the upper part of the ventilation housing 1, there is arranged the previously-mentioned outlet opening 6 with communication (not shown) to fresh air nozzles in the vehicle. Means for regulating the air flow through the opening 6 are incorporated in the instrument panel 29 of the vehicle.

Downstream of the heat exchanger 5, on the underside of the ventilation housing 1, there is fastened an air distribution box 26 by means of rivets and/or screws (not shown) with an intermediate sealing packing 27. The distribution box 26 comprises a lower casing 27 and a draught valve housing 28 fastened to it by means of rivets (not shown) or the like. The previously mentioned outlet openings 7–9 are arranged in the casing 27, a draught valve (not shown) for heat regulation being arranged in the outlet opening 8. In the same way, a draught valve (not shown) is arranged in the draught valve housing 28 for heat regulation via the outlet 7 leading to the floor in the forward portion of the vehicle passenger compartment. The third outlet opening 9 is formed between the respective rear sides of the ventilation housing 1 and the casing 27 while forming an air gap corresponding to the width of the casing 27. Air is fed through said air gap to the upper forward portion of the passenger compartment via nozzles (not shown) arranged in the instrument panel 29 of the vehicle. The outlet opening 9 is illustrated in FIG. 4, also showing sealed attachment to a support structure 30 transversely mounted in the vehicle.

A ventilation housing 1, formed and put together according to the above, constitutes a part of an integrated unit preassembled before fitting to the vehicle. The basic member in such a unit is the support structure 30, and apart from the ventilation housing 1 the support structure 30 has attached to it the vehicle instrument panel 29 and steering column jacket (not shown) as well as controls for the vehicle air conditioning unit and lighting system etc. The assembled unit is partly shown in FIG. 3, only devices necessary for clarifying the invention and the air conditioning unit being shown. This means that controls, draught valves, communicating members etc. are not shown to a greater extent than is necessary for understanding the construction and function of the ventilation system.

Along the greater portion of its length the support structure 30 is formed as a closed tubular beam, and at each end the support structure 30 is arranged for attaching to a side bracket (not shown), fixed to supporting portions of the vehicle, when fitting the assembled unit in the vehicle. As previously mentioned, the ventilation housing 1 is attached to the support structure 30, the gap-shaped outlet opening 9 between the ventilation housing 1 and the casing 27 fitting sealingly in a recess (not shown) on the hollow portion of the support structure 30. This is arranged to supply air to nozzles in the passenger compartment via the instrument panel 29, which is also attached to the support structure 30. Said nozzles suitably comprise two defroster nozzles 31 and two side nozzles 32.

A lower beam element 33 is attached to the draught valve housing 28, which is in turn attached to the ventilation housing 1. The beam element 33 is formed with a longitudinal cavity forming an air duct. There is a recess 34 approximately at the middle of the air duct, by means of which the beam element 33 can be mounted onto the draught valve housing 28 and fastened sealingly against it. A number of outlet apertures (not shown) are made in the beam element 33 and air from the ventilation housing 1 can be led via the outlet 7 and the draught valve housing 28 out at the floor in the forward part of the passenger compartment. As a further support for the beam element 33 there are two brackets 35 fastened between the support structure 30 and the beam element 33, one of these brackets being shown in FIG. 3.

The outlet opening 8 opens out into a funnel-shaped bend 36, to which two air ducts 37,38 are attached, these duct leading air to the rear portion of the passenger compartment. The outlet opening 6 upstream of the heat exchanger 5 is connected via an air duct 39 to at least one fresh air nozzle 40 formed in the instrument panel 29.

Necessary controls for the air conditioning apparatus described above are arranged in the instrument panel 29 of the vehicle, at the middle and on the sides, and between the front seats in the vehicle. In FIG. 3, only the middle controls 41 in the instrument panel 29 are shown, however. Changing air in the passenger compartment is done by fresh air being taken in via the nozzles, either directly as cold air or via the heating system as warmed air, and evacuating it through outlet openings on the vehicle body sides. To achieve good air changing, it is advantageous to adjust the fan 3 for driving at at least two different speeds, a lower speed for continuous operation and a higher speed for use when there is a need of rapid air change.

The described arrangement of air filtration in a ventilation system can be modified within the purview of the invention in alternative embodiments. It is necessary, however, that the filter 4 is insensitive to pressure drops, moisture and vibrations. The filter 4 shall furthermore be easily exchangeable, only the filter composition 13 in the cassette 12 needing to be changed. Inspection of the filter 4 suitably takes place in conjunction with other service inspections of the vehicle.

I claim:

1. An arrangement in a ventilation system for a vehicle passenger compartment, comprising a ventilation housing mounted transverse at the forward part of the passenger compartment and formed with a through passage for leading air from an outer air intake to at least one air outlet opening out in the vehicle passenger compartment, a fan for acting on the air flow through said passage, said housing having at least one opening, an insert unit inserted into said opening so as to extend transverse of the through passage, the insert having portions engaging with portions of the ventilating housing, and means fastening some of the engaged portions of the housing and unit to each other so as to mount the unit on the housing, the unit being an air filter in a cassette or an evaporator for an air cooling system.

2. An arrangement as claimed in claim 1, wherein the part of the evaporator intended to be inserted in the passage in the ventilation housing has the same form and dimensions as the cassette with the filter insert.

3. An arrangement as claimed in claim 2, wherein the cassette has a parallel epipedic form with perforations formed in the walls for allowing air through in the flow direction.

4. An arrangement as claimed in claim 3 wherein the cassette accommodates at least one exchangeable filter shaped as a parallel epipede.

5. An arrangement as claimed in claim 4, wherein the filter is formed from glass fibre material and has a diminishing porosity in the flow direction.

6. An arrangement as claimed in claim 4 or 5, wherein the cassette is arranged to suit the opening on the ventilation housing with sealing abutment against the defining walls for the through passage formed in the ventilation housing.

* * * * *